United States Patent [19]

McCartney, Jr. et al.

[11] Patent Number: 4,756,982
[45] Date of Patent: Jul. 12, 1988

[54] DUAL SEAL BATTERY VENT VALVE

[75] Inventors: Charles P. McCartney, Jr., Yorktown; Clarence A. Meadows, Muncie, both of Ind.

[73] Assignee: General Motors Corporation, Detroit, Mich.

[21] Appl. No.: 118,163

[22] Filed: Nov. 9, 1987

[51] Int. Cl.⁴ .............................................. H01M 2/12
[52] U.S. Cl. .................................. 429/54; 137/512.4; 137/516.25; 137/854
[58] Field of Search ............... 429/53, 54; 137/511, 137/512, 512.4, 516.25, 854

[56] References Cited

U.S. PATENT DOCUMENTS

| | | | |
|---|---|---|---|
| 2,912,999 | 11/1959 | Kersh | 137/512.4 |
| 3,124,488 | 3/1964 | Ruetschi | 136/178 |
| 3,484,301 | 12/1969 | Gray | 136/178 |
| 3,604,451 | 9/1971 | Delamater | 137/516.25 |
| 4,086,394 | 4/1978 | Tesch | 429/54 |
| 4,328,290 | 5/1982 | Szymborski | 429/54 |

*Primary Examiner*—Donald L. Walton
*Attorney, Agent, or Firm*—Lawrence B. Plant

[57] ABSTRACT

A "sealed" electric storage battery having a check-/relief valve for controlling the venting and resealing pressures for the battery wherein the valve has at least two separate sealing members each capable of adjustment independently of the other for better control of both the venting and resealing pressure.

13 Claims, 2 Drawing Sheets

DUAL SEAL BATTERY VENT VALVE

This invention relates to valves for venting electric storage batteries.

BACKGROUND OF THE INVENTION

Sealed batteries are well known in the art and typically include a relief/check valve for venting gases generated within the cell compartment when the internal pressure exceeds a predetermined super atmospheric level. Nickel-zinc batteries, for example, commonly operate with a positive internal pressure of about one-half pound per square inch or more to promote oxygen recombination within the battery and to keep $CO_2$ in the air from contaminating the electrolyte when the pressure in the cell falls below zero psig. Similarly gas recombination type lead-acid batteries are known to operate at internal pressures ranging from about $\frac{1}{2}$ psig to about 50 psig (i.e., depending on the particular application) to promote the oxygen recombination reaction and to exclude ambient oxygen from the battery. It is necessary for the prolonged life of such batteries that after the gases have been vented the relief/check valves close and reseal as near as possible to their opening pressure in order (1) to prevent unnecessary loss of the internal gases otherwise available for recombination and (2) to prevent any influx of ambient atmosphere into the battery as the internal pressure within the battery falls.

Sealed batteries have heretofore used relief/check valves employing a single valve member which controls the venting pressure of the battery and which is relied on to reseal the cell compartment when the pressure in the compartment falls below the venting (i.e. valve opening) pressure. In practice, however, some such single member valves do not actually reseal again until pressures as low as 25% or less of their opening pressure are reached. In fact, some such valves tested by Applicant's assignee did not reseal until the pressure in the battery had dropped below zero psig. No commercially available battery relief/check valve has been found which provides effective resealing near the opening pressure.

Accordingly, it is an object of the present invention to provide a unique relief/check valve with independent venting and sealing members for venting an electric storage battery at a predetermined superatmospheric venting pressure and resealing it at pressures at or near the venting pressure. This and other objects and advantages of the present invention will become more readily apparent from the detailed description thereof which follows.

BRIEF DESCRIPTION OF THE INVENTION

The present invention comprehends an electric storage battery having a container including a compartment containing a gas-generating galvanic cell and a check-/relief valve for venting and resealing the compartment at independently controlled predetermined pressures. The valve will desirably reseal the compartment at pressures of at least about 50% of its opening pressure and preferably as close to the opening pressure as possible. The valve of the present invention comprises a housing having an inner wall defining a vent chamber which in turn has a gas inlet for receiving gases from within the battery, an outlet for discharging the gases to the atmosphere and dual valve means intermediate the inlet and the outlet for separately controlling the venting and resealing pressures of the battery. The valve means includes a first sealing member adapted to open when the gas pressure in the compartment rises above a predetermined venting pressure as determined by the battery designers. The valve means also includes a second sealing member which opens whenever the first sealing member is open but which is adapted to close and isolate/reseal the compartment before the first member completely reseals and preferably when the pressure within the compartment drops to a pressure which is not significantly less than the venting pressure.

Preferably the sealing members are dish-shaped elastomers having a concave configuration and stacked one atop the other within the chamber. The dish-shaped members each include an annular flap portion extending radially outwardly from a central hub portion which flap has a thin periphery engaging the inner wall of the vent chamber. Prior to insertion into the chamber the outside diameter of the sealing member will be slightly larger than the inside diameter of the chamber such that the washers will fit into the chamber in essentially an interference fit and thereby cause the thin periphery of the flap to intimately engage the inner wall defining the chamber and effect a seal thereat. The flap will preferably taper from the hub portion toward the thin periphery thereof which periphery will preferably comprise a narrow annular surface which conforms substantially to the inner wall in a face-to-face relationship when the sealing members are positioned in the chamber.

In accordance with the present invention, one of the sealing members controls the opening or venting pressure of the cell compartment while the other sealing member serves to reseal the compartment after venting has been accomplished and the pressure therein begins to drop. The pressures at which the venting and resealing are effected can be adjusted in a number of ways. One technique for controlling the opening and resealing pressures is to vary the outside diameter of the washers relative to the inside diameter of the chamber wall and thereby vary the degree of interference fit that is achieved. The larger the outside diameter of the members with respect to the inside diameter of the chamber the more prestress is put into the member and hence the higher the pressure required to open and reseal them. In this same context, the chamber may conveniently be tapered from the outlet in the direction of the inlet so that two sealing members having identical configurations and material composition will, when placed in the chamber be prestressed to different amounts such that the member in the narrower portion of the chamber will have a higher degree of prestress and hence higher opening pressure than the member in the wider portion of the chamber. Another way to control the venting-/resealing pressures of the respective sealing members is to simply vary the composition of the elastomer used in each such that one has a higher degree of flexibility (i.e. lower durometer) than the other. In this situation, the member having the higher durometer will serve to control the venting pressure of the compartment while the member having the lower durometer, and hence more flexibility, will serve to effect the rapid, positive resealing of the battery as the pressure within the compartment drops. Still another way to control the venting/resealing characteristics of the valve members is to vary the shape of the flap from one to the other. This may be accomplished by varying the degree of concavity between the several sealing members or simply change the degree of taper that the flaps have from the hub to the periphery.

In a most preferred embodiment, the several sealing members will have a central hub portion including a projection on one face thereof and a cavity in the opposite face thereof axially aligned with, and conforming to the shape of, the projection. This permits ready alignment and stacking of the several members by conveniently nesting the projection of one member with the cavity in the next adjacent member. This expedient insures that all of the members are perfectly aligned one with the other before insertion as a set into the venting chamber and maintains the position of the members in the chamber after insertion has been effected.

According to another embodiment of the present invention, a single, dish-shaped, elastomeric sealing member includes a shank portion at its hub from which the sealing flap portion extends radially to engage the chamber walls as discussed above. In this embodiment the shank portion serves to control the venting pressure while the flap portion controls the resealing pressure. The underside of the shank portion seats against the housing surrounding the inlet so as to seal off the inlet. When the gas pressure within the cell compartment is sufficient to compress the shank portion the shank unseats from around the inlet so that the gases may enter the chamber, deflect the periphery of the flap away from the chamber wall and exhaust to the atmosphere. This embodiment has the particular advantage of providing a very compact, economical, one-piece, low silhouette dual seal.

DETAILED DESCRIPTION OF SPECIFIC EMBODIMENTS

The invention may better be understood when considered in conjunction with the following detailed description of certain specific embodiments thereof which is given hereafter in conjunction with the several drawings in which.

Figure 1:
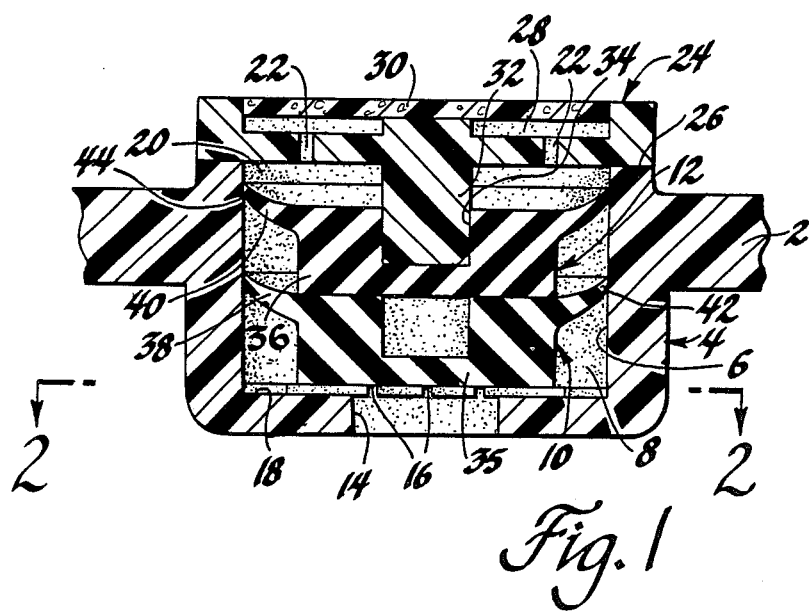
FIG. 1 is a sectioned, elevational view of a battery check/relief valve in accordance with the present invention.
Figure 2:
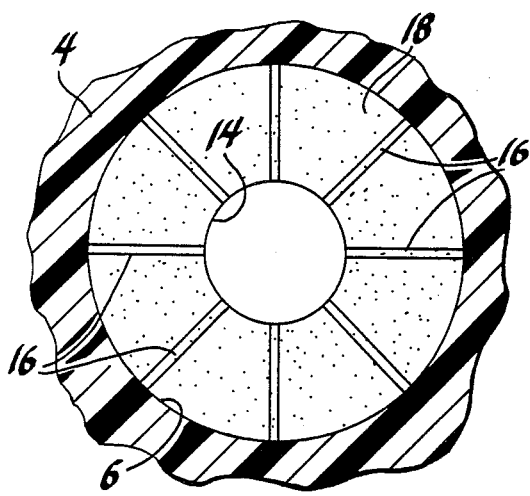
FIG. 2 is a view in the direction 2—2 of FIG. 1.
Figure 3:
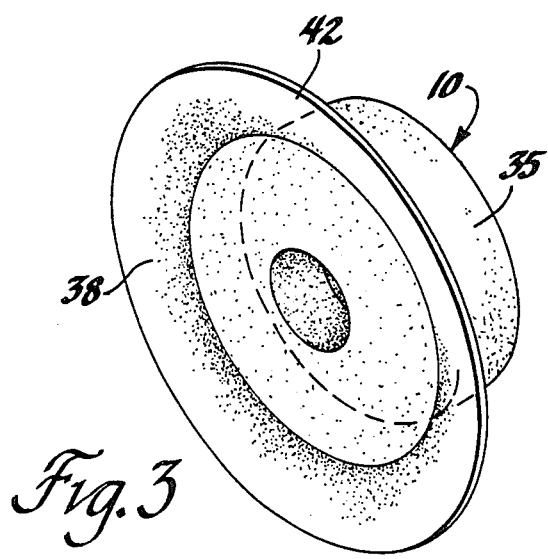
FIG. 3 is an isometric view of one of the sealing members shown in FIG. 1.

FIG. 1 depicts a battery container wall 2 (e.g., cover) having a valve housing 4 formed therein. The housing 4 includes an inner wall 6 defining a chamber 8 containing discrete valve members 10 and 12 stacked one atop the other. An inlet 14 through the underside of the housing 4 communicates the chamber 8 with the cell compartment, not shown. A plurality of ribs 16 radially extending from the inlet 14 support the valve member 10 away from the floor 18 of the housing 4 so that gases may readily pass into the chamber 8. An outlet 20 at the other end of the housing 4 allows the gases to escape from the chamber 8 to the surrounding atmosphere via apertures 22 in a cap 24 which is sealed (e.g., ultrasonically) to the mouth 26 of the housing 4. The apertures 22 open into an annular cavity 28 in the cap 24 which in turn is covered by a porous flame arrestor 30 as is well known in the art. The cap 24 includes an integrally molded, downwardly extending projection 32 which nests in a cavity 34 provided in the upper sealing member 12 and serves to position and hold the sealing members 10 and 12 securely in the chamber 8, as shown. The sealing members 10 and 12 each include a hub portion 35 and 36 respectively and flap portions 38 and 40 respectively. The flap portions 38 and 40 project upwardly to provide a dish-shaped configuration in the direction the gas exits the battery which not only facilitates positioning of the sealing members in the chamber 8 but also prevents the flaps from accidentally deflecting backwardly toward the inlet end of the housing 4. The flaps 38 and 40 generally taper in cross section being thicker adjacent the hub portions 34 and 36 to a very thin section at the peripheries 42 and 44 thereof where the flaps engage the inner wall 6 of the housing 4.

In the embodiment shown in FIG. 1, the sealing member 10 will comprise a stiffer elastomer than the sealing member 12 hence requiring a higher internal pressure to cause the annular flap 38 to deflect than that required to cause the annular flap 40 to deflect. Hence the sealing member 10 will serve to control the venting pressure of the cell compartment. The sealing member 12 will contain the softer or more flexible elastomer so that the flap 40 will deflect at a lower pressure than the flap 38 but will seal more quickly and tightly than the flap 38 when the pressure within the cell container drops.

Figure 4:
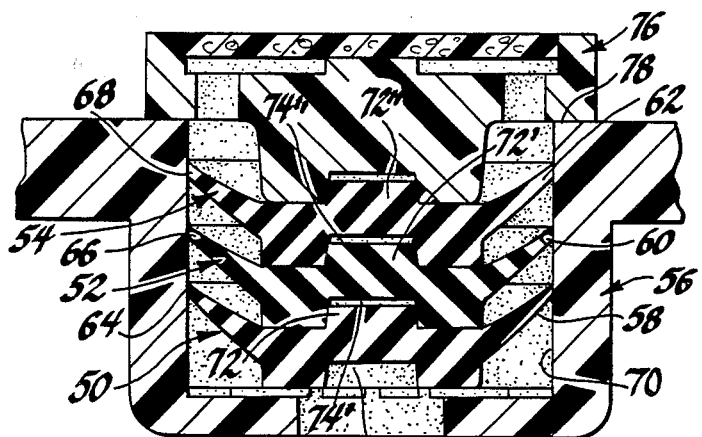
FIG. 4 is a sectioned elevational view of another embodiment of a valve in accordance with the present invention.

FIG. 4 depicts another embodiment in accordance with the present invention wherein three (or more) dish-shaped (i.e., about 30 degree upslope) sealing members 50, 52 and 54 (i.e., about 13.8 mm O.D.) are stacked one atop the other in a housing 56 as shown. In this embodiment, one or more of the sealing members may comprise the stiffer elastomeric material for controlling the venting pressure and one or more of the sealing members may comprise the more flexible elastomeric material to control the resealing pressure of the cell compartment. The use of such redundant seals insures positive sealing of the cell compartment under conditions where debris, or perchance a distorted flap 58, 60 or 62 might otherwise prevent positive sealing of any one of the sealing members. Moreover, and as best shown in FIG. 4, the annular flaps 58, 60 and 62 will each preferably have a periphery comprising a narrow annular surface 64, 66 and 68 (i.e., about 0.3 mm wide) respectively which conforms substantially to the inner wall 70 and forms a face-to-face seal therewith. Still another feature of the embodiment shown in FIG. 4 is the inclusion of a projection 72 and cavity 74 at the center and on opposite ends of each of the sealing members as shown. The projections 72, 72' and 72" will conform substantially to the shape of the cavities 74, 74' and 74" so that the projections of one sealing member will nest securely in the cavity of the next adjacent sealing member for perfect alignment of the several sealing members one with the other. A cap 76 secured to the mouth 78 of the housing 56 serves to hold the several sealing members in position in the housing 56 as shown. The venting apertures and flame arrestors are as discussed above in conjunction with FIG. 1.

Figure 5:
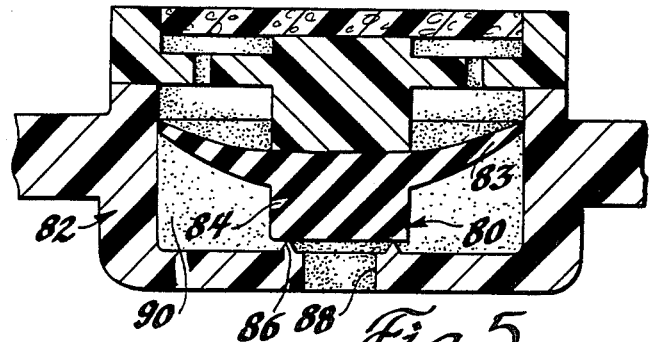
FIG. 5 is a sectional view of still another embodiment of a valve in accordance with the present invention.

FIG. 5 depicts another embodiment of the present invention wherein a single sealing member 80 is positioned in the housing 82. The sealing member 80 includes a resealing flap portion 83, as discussed above, and shank portion 84 at the hub of the member 80 formed integrally with and of the same elastomer as the flap 83. The shank portion 84 seats on an annular projection 86 which surrounds the inlet 88 to form the valve means for controlling the venting pressure within the cell compartment. In this embodiment, the shank portion 84 will compress when the gas pressure within the cell compartment exceeds the desired predetermined value thereby unseating the shank and letting the gases pass between the seat 86 and the underside of the shank portion 84 for eventual escape from the chamber 90 by deflecting the flap 83 in the manner discussed above.

Figure 6:
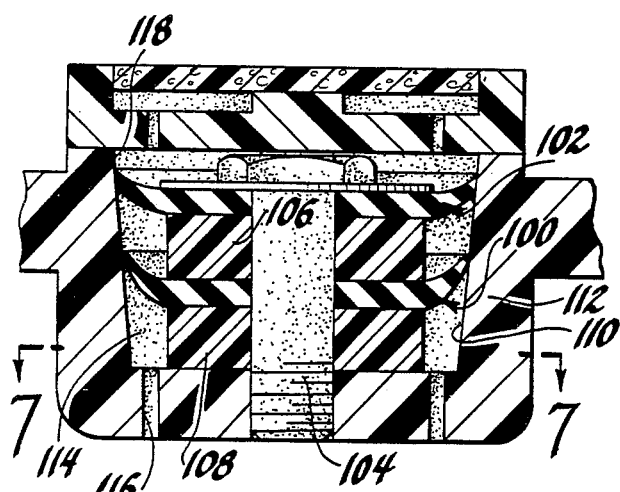
FIG. 6 is a sectional view of still another embodiment of a valve in accordance with the present invention.
Figure 7:
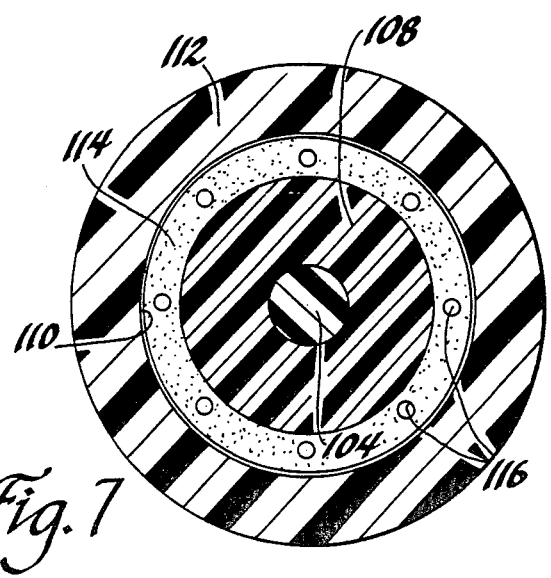
FIG. 7 is a view in the direction 7—7 of FIG. 6.

FIG. 6 is still another embodiment of the present invention wherein the several valving members 100 and 102 are secured in place by means of a bolt 104 rather than by the caps of the other embodiments. Moreover in this embodiment, the sealing members 100 and 102 are separated one from the other by washers 106 and 108, or the like, which may be made from a rigid material as they do not serve any valving function whatsoever but rather serve merely to space the flap portions apart. Alternatively the washers 108 may be molded integrally with the floor of the housing 112. In this embodiment, the inner wall 110 of the housing 112 defines a chamber 114 which is narrower near the inlets 116 than at the outlet 118 so that positioning of the sealing members 100 and 102 causes greater prestressing of the sealing member 100 than sealing member 102 thereby raising the level of the pressure required to deflect the sealing member 100 during venting.

While the invention has been disclosed primarily in terms of specific embodiments thereof it is not intended to be limited thereto but rather only to the extent set forth hereafter in the claims which follow.

The embodiments of the invention in which an exclusive property or privilege is claimed are defined as follows:

1. In an electric storage battery comprising a container defining a compartment containing a gas-generating galvanic cell and means operatively associated with said container to vent said compartment when the gas pressure within said compartment is high and to reseal said compartment from the ambient atmosphere when the gas pressure in said compartment is low the improvement wherein said means comprises:

a housing having an inner wall defining a chamber;

an inlet to said chamber from said compartment;

an outlet from said chamber to the ambient atmosphere; and check/relief valve means intermediate said inlet and outlet for separately controlling the venting and resealing pressures at predetermined levels, said valve means comprising a first sealing member adapted to open when the gas pressure in said compartment rises above said predetermined venting pressure, and a second sealing member adapted to close and reseal said compartment when the pressure within said compartment drops to said predetermined resealing pressure;

whereby positive resealing and isolation of said compartment near said predetermined venting pressure is achievable totally independently of the resealing characteristics of the first sealing member.

2. A battery according to claim 1 comprising a dish-shaped second sealing member having a central hub portion and an elastomeric flap portion extending radially outwardly from said hub portion, said flap portion having a peripheral edge which sealingly engages said inner wall when closed and is deflected radially inwardly out of engagement with said wall when open to vent said gas.

3. A battery according to claim 2 wherein said hub portion includes an elastomeric shank seated against said housing around said inlet so as to seal closed said inlet at pressures beneath said venting pressure and being adapted to compress and unseat from said housing when the gas pressure in said compartment rises above said venting pressure to vent said gas from said compartment.

4. A battery according to claim 2 wherein said flap has a thin-sectioned edge.

5. A battery according to claim 3 wherein said flap has a thin-sectioned edge.

6. A battery according to claim 4 wherein said flap tapers toward said thin-sectioned edge.

7. A battery according to claim 5 wherein said flap tapers toward said thin-sectioned edge.

8. A battery according to claim 2 comprising a dish-shaped first sealing member having a central hub portion and an elastomeric flap portion extending radially outwardly from said hub portion, said flap portion having a peripheral edge which sealingly engages said inner wall when closed to contain said gas in said compartment when the pressure in said compartment is below said venting pressure and is deflected radially inwardly out of engagement with said wall when open to vent said gas when the pressure in said compartment exceeds said venting pressure.

9. A battery according to claim 8 wherein said chamber has a narrower portion near the inlet than the outlet and the second sealing member is positioned in said narrower portion.

10. A battery according to claim 8 wherein said hub portions of said first and second members each have (1) first and second faces on opposite ends thereof, (2) a projection extending from said first face and (3) a cavity in said second face axially aligned with said projection, said members being stacked one atop the other such that the projection on one of said members nests in the cavity of the next adjacent member in the stack.

11. A battery according to claim 8 wherein said flap of said second sealing member is comprised of a more flexible elastomer than the flap of said first sealing member.

12. A battery according to claim 2 wherein said periphery comprises a narrow annular surface conforming substantially to said inner wall.

13. A battery according to claim 1 wherein said chamber has a floor through which said inlet extends, said floor having a plurality of upstanding ribs spacing said valve means away from said floor.

* * * * *